(12) United States Patent
DeWitte et al.

(10) Patent No.: US 6,868,212 B2
(45) Date of Patent: Mar. 15, 2005

(54) METHOD AND APPARATUS FOR CONTROLLING WAVELENGTH AND DOMINANT MODE IN FIBER LASERS

(75) Inventors: Jeannie DeWitte, Burke, VA (US);
Yuri Grapov, Park City, UT (US);
David Owen, West Jordan, UT (US);
Dennis Elkins, Draper, UT (US);
Aaron McAllister, Sandy, UT (US);
Allen Tanner, Sandy, UT (US)

(73) Assignee: Evans & Sutherland Computer Corporation, Salt Lake City, UT (US)

( * ) Notice: Subject to any disclaimer, the term of this patent is extended or adjusted under 35 U.S.C. 154(b) by 0 days.

(21) Appl. No.: 10/383,909

(22) Filed: Mar. 6, 2003

(65) Prior Publication Data

US 2004/0175081 A1 Sep. 9, 2004

(51) Int. Cl.[7] .................................................. G02B 6/02
(52) U.S. Cl. ........................... 385/123; 385/13; 385/14; 372/6
(58) Field of Search ............................ 385/123, 14, 39, 385/11, 27, 28, 13; 398/29; 372/6

(56) References Cited

U.S. PATENT DOCUMENTS

| | | |
|---|---|---|
| 4,636,031 A | 1/1987 | Schmadel, Jr. et al. |
| 4,725,110 A | 2/1988 | Glenn et al. |
| 5,007,705 A | 4/1991 | Morey et al. |
| 5,053,698 A * | 10/1991 | Ueda ........................... 714/736 |
| 5,159,601 A | 10/1992 | Huber |
| 5,691,999 A | 11/1997 | Ball et al. |
| 6,188,712 B1 * | 2/2001 | Jiang et al. .................... 372/96 |
| 6,229,827 B1 | 5/2001 | Fernald et al. |
| 6,240,220 B1 | 5/2001 | Pan et al. |
| 6,356,683 B1 | 3/2002 | Hu et al. |
| 6,360,042 B1 | 3/2002 | Long |
| 6,363,089 B1 | 3/2002 | Fernald et al. |
| 6,366,721 B1 | 4/2002 | Hu et al. |
| 6,374,015 B1 | 4/2002 | Lin |
| 6,393,181 B1 | 5/2002 | Bulman et al. |
| 6,396,994 B1 | 5/2002 | Philipson et al. |
| 6,643,299 B1 * | 11/2003 | Lin ................................ 372/6 |
| 6,671,293 B2 * | 12/2003 | Kopp et al. ..................... 372/6 |
| 2002/0071453 A1 * | 6/2002 | Lin ................................ 372/6 |

* cited by examiner

Primary Examiner—K. Cyrus Kianni
(74) Attorney, Agent, or Firm—Thorpe North & Western, LLP

(57) ABSTRACT

A method for adjusting the wavelength and dominant mode of a laser fiber prior to installation in a laser assembly includes the steps of linearly stretching the laser fiber so as to modify its output wavelength, axially twisting the laser fiber so as to modify its dominant mode, and affixing the laser fiber to a laser assembly in its linearly stretched and axially twisted condition. The laser assembly includes a dynamic tuning mechanism for wavelength adjustment during use. The twisted and stretched fiber has an unadjusted wavelength and dominant mode that are within a selected range before adjustment by the dynamic tuning mechanism.

23 Claims, 3 Drawing Sheets

METHOD AND APPARATUS FOR CONTROLLING WAVELENGTH AND DOMINANT MODE IN FIBER LASERS

BACKGROUND OF THE INVENTION

1. Field of the Invention

The present invention relates generally to the tuning of fiber lasers. More particularly, the present invention relates to an apparatus and method for initially adjusting the wavelength and dominant mode of a fiber laser during installation into a laser assembly.

2. Related Art

Fiber lasers provide an excellent source of infrared energy for coupling in external conversion cavities. Fiber lasers can provide a simple source of high power, single mode infrared energy. In essence, a fiber laser is an optically pumped resonator with a doped-fiber as the gain medium. Fiber lasers are manufactured by subjecting a doped photosensitive fiber to an interference pattern of ultraviolet laser light to create a periodic variation in the refractive index of the fiber. This variation in the refractive index creates the resonating cavity of the distributed feedback laser.

It is well known that stressing a fiber by compression or elongation alters the wavelength and modes produced by the laser. Stressing the fiber alters both the period of the resonating cavity imprinted on the fiber, and the favored polarization of the emitted light.

There are a number of prior inventions that relate to stressing fiber lasers. Some of these provide a method for tuning a fiber laser's wavelength by imposing stress on the fiber through mechanical or thermal compression or tension. These prior methods use a variety of mechanisms for accomplishing this task, including levers, screw mechanisms, elongating stems, and bimetallic strips. Some prior inventions also allow longitudinal mode selection.

These mechanical stressing methods provide a means of control during normal operation of the laser, but do not provide a means of permanently tuning the laser during fabrication and assembly, or while connecting the fiber to a more sensitive control mechanism.

SUMMARY OF THE INVENTION

The present invention advantageously provides a method and apparatus for adjusting a fiber laser's wavelength and dominant mode to be within a certain threshold during installation, to thereby allow its dynamic tuning assembly to more accurately adjust within a dynamic range during use.

In accordance with one aspect thereof, the invention provides a method for adjusting an output wavelength and a dominant mode of a laser fiber prior to installation in a laser assembly. The method includes the steps of a) linearly stretching the laser fiber so as to modify its output characteristics; b) axially twisting the laser fiber so as to modify its output characteristics; and c) affixing the laser fiber to a laser assembly in its linearly stretched and axially twisted condition.

In accordance with another aspect of the present invention, the invention provides an apparatus for tuning the output wavelength and dominant mode of a fiber laser. The apparatus includes a moveable bed, a rotatable gear assembly, and an adjustment mechanism. The moveable bed is configured to receive a fiber laser assembly with a first end of a laser fiber affixed to it. A second end of the laser fiber is clamped to the rotatable gear assembly. The adjustment mechanism is configured to (i) move the bed linearly away from the gear assembly, so as to linearly stretch the laser fiber, and (ii) rotate the gear assembly to axially twist the laser fiber. These actions allow rough adjustment of the output wavelength and dominant mode of the laser fiber prior to permanently affixing the laser fiber to the fiber laser assembly.

In accordance with yet another aspect thereof, the invention provides a fiber laser for emitting a laser beam, the fiber laser comprising a substrate with a length of laser fiber coupled thereto. The substrate includes a dynamic tuning mechanism that is configured to modify an adjusted output wavelength of the laser fiber by adjusting the length of the fiber during use. Advantageously, the laser fiber is coupled to the substrate in a linearly stretched and axially twisted condition, such that an unadjusted wavelength and dominant mode of the fiber are within a selected range before adjustment by the dynamic tuning mechanism.

Additional features and advantages of the invention will be apparent from the detailed description which follows, taken in conjunction with the accompanying drawings, which together illustrate, by way of example, features of the invention.

DETAILED DESCRIPTION

Figure 1:
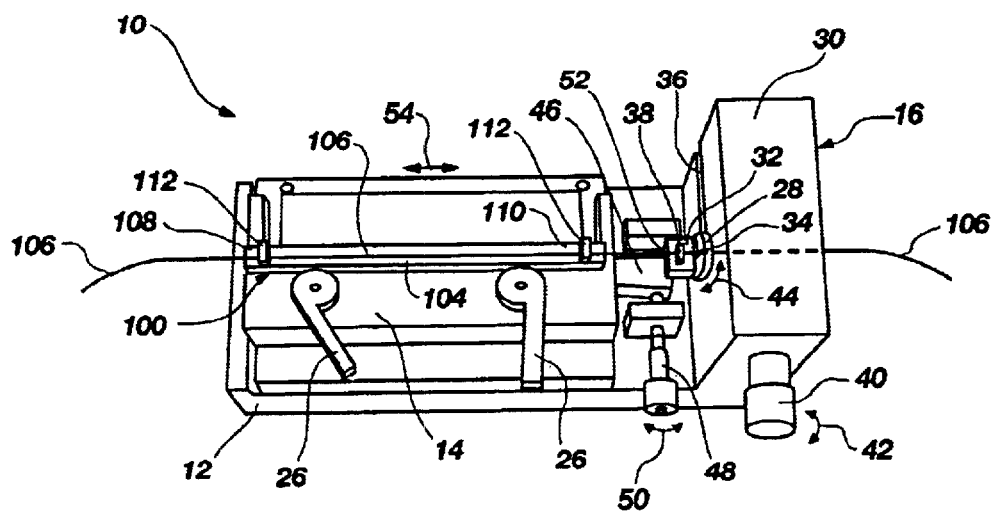
FIG. 1 is a top perspective view of one embodiment of a fiber laser tuning device in accordance with the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Fiber lasers are currently used in a wide variety of applications. They are used for high-power projectors, laser cutting or marking systems, optical communication systems, and any application where one laser is used to pump another laser. In most uses of fiber lasers, it is desirable to maintain the laser signal at a constant output wavelength. However, the output of a fiber laser can change during use in response to temperature variations and mechanical vibrations. As a fiber laser apparatus heats up or is vibrated, the output wavelength of the laser light can change substantially. To compensate for this, typical fiber laser assemblies are configured to dynamically tune the laser by adjusting the length of the laser fiber, thereby changing the length and period of oscillation.

Figure 5:
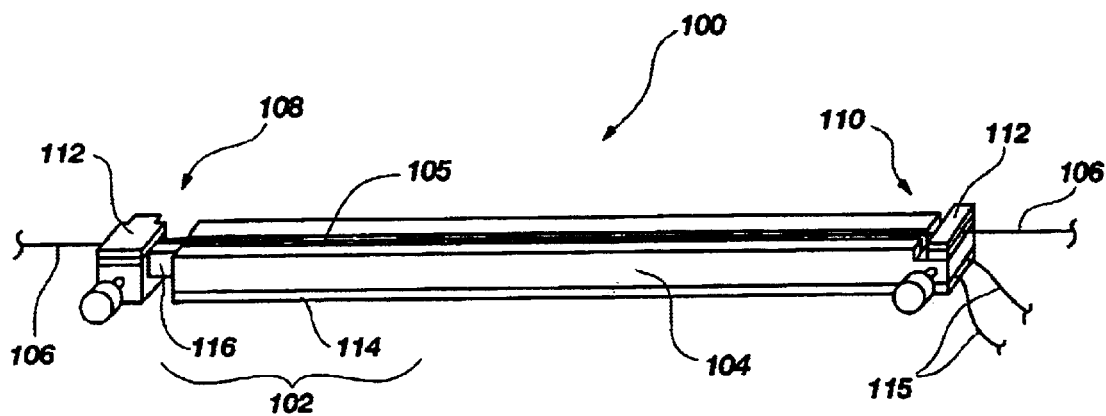
FIG. 5 is a side view of a typical fiber laser assembly.

Depicted in FIG. 5 is a typical fiber laser assembly 100 including a dynamic tuning mechanism 102. The laser assembly generally comprises an elongate substrate 104, such as a bar of aluminum, with an elongate groove 105 and a laser fiber 106 disposed in the groove and attached to the first end 108 and second end 110 of the assembly. In FIG. 5, the fiber is attached to the assembly by steel clamps 112, but could be attached by other means, such as an adhesive, etc. The dynamic tuning mechanism comprises a heating element 114 affixed to the bottom of the substrate and connected to an electrical power source through electrical wires 115, and a piezo-electric crystal 116 disposed between the substrate and the fiber clamp at the first end 108 of the assembly.

The piezo-electric crystal 116 is configured to very accurately and rapidly extend or contract the distance between the two fiber clamps 112 in response to electrical signals provided thereto. Similarly, the heating element 114 thermally expands or contracts in response to electrical current to adjust the distance between the fiber clamps. With these two components, the dynamic tuning mechanism continuously, dynamically tunes the laser 100 by adjusting the distance between the clamps, based upon feedback that senses the output wavelength of the laser during use, so as to continuously tune the output wavelength in response to temperature variations, mechanical vibrations, or other factors. This allows the laser assembly to maintain a constant output wavelength under a variety of conditions.

It will be apparent that the dynamic tuning mechanism 102 will have mechanical limits to its range of adjustment. Consequently, to effectively maintain the desired output wavelength, the unadjusted output characteristics of the laser fiber 106 must start within a range that the dynamic tuning assembly can effectively adjust to compensate for foreseeable conditions. This requires that the physical dimensions of the laser fiber be very carefully controlled during manufacture. Additionally, variations in the quality and physical characteristics of the laser fiber itself also contribute to variations in the output wavelength. Consequently, in order to produce fiber lasers with desired output characteristics, highly accurate and expensive manufacturing processes are required. Naturally, this increases the cost and limits the range of application of fiber lasers.

Advantageously, the inventors have devised a method and apparatus for tuning a fiber laser during manufacture that provides a more accurate gross adjustment of the laser output wavelength characteristics, such that lower manufacturing tolerances will still produce a fiber laser that has unadjusted output characteristics within an acceptable range for a dynamic tuning device. At the same time, the inventors have also discovered a method for isolating the dominant mode of a fiber laser.

The term "dominant mode" refers to the dominant mode of oscillation of the fiber laser. For a given laser application, it is often desirable to have light energy of a single oscillation mode. However, in part because of impurities or inconsistencies in the material of the laser fiber, additional modes will still be produced. These additional modes take energy away from the desired mode, thus reducing the energy efficiency of the laser. It is thus desirable to isolate the desired mode as the dominant mode, and to suppress other modes.

The inventors have found that axially twisting a laser fiber tunes the laser to the dominant mode, and suppresses other modes. The exact reasons for this are not entirely clear. It is believed that because laser fibers are comprised of birefringent material, torsional stress on this material suppresses all but the dominant mode. However, the exact mechanism is still unclear. Nevertheless, extensive testing has confirmed that twisting of a laser fiber has the effect of suppressing undesired oscillation modes in the fiber.

Based on these discoveries, the inventors have developed a method and apparatus for initially tuning the wavelength and dominant mode of a fiber laser during installation into a laser assembly. The invention provides a means to adjust a fiber laser's wavelength during installation to get the wavelength in the correct range for the tuning system. It also isolates the dominant mode. The invention effectively decreases the required manufacturing tolerances of fiber lasers and increases the effective dynamic range of the dynamic tuning system by eliminating biases.

The apparatus functions to twist and stretch a laser fiber as an initial adjustment before installation into a laser assembly. The apparatus 10 for twisting and stretching the fiber laser is shown in FIGS. 1–4. The apparatus generally consists of a base 12 supporting a bed 14 for receiving the fiber laser assembly 100, a gear assembly 16 for rotating the free end 18 of the fiber 106, and a wedge assembly 20 for stretching the laser fiber. The bed is slidably disposed along a linear track 22 located on the base, and includes a laser groove 24 for receiving the laser assembly, and a pair of laser assembly clamps 26 for affixing the laser assembly in the bed. These clamps generally comprise a rotatable cam with a radial arm for allowing a user to rotate the clamps from an unlocked position to a locked position.

The gear assembly 16 includes a rotatable axle 28 disposed at the centerline of the gear assembly housing 30. The axle is axially aligned with the long axis of the laser fiber 106 when a laser assembly 100 is disposed in the laser groove 24. The axle includes a fiber mounting platform 32 and a center aperture 34, and the gear assembly housing includes a fiber loading groove 36 to allow a fiber to be slid to the center aperture. Once in place, the fiber is affixed to the fiber mounting platform with a fiber clamp 38, and the long axis of the fiber thereby becomes collinear with the axis of rotation of the gear assembly, so that rotation of the axle has the effect of axially twisting the fiber about its long axis.

The gear assembly 16 includes a gear assembly knob 40, which is interconnected to a highly accurate reduction gear system (not shown) disposed within the gear assembly housing 30. When a user rotates the gear assembly knob, as indicated by arrow 42, this causes the reduction gear assembly to rotate the axle 28 and thereby twist the fiber 106, as indicated by arrow 44. In one embodiment, the system is designed such that one rotation of the gear assembly knob produces one quarter rotation of the axle. This provides very accurate control of the amount of rotation applied to the fiber, allowing a user to accurately apply very small amounts of twist to the fiber. Naturally, other rotational ratios could be used.

The wedge assembly 20 is connected to the base 12 and disposed between the slidable bed 14 and the gear assembly housing 30. The wedge assembly includes a metal wedge 46, interconnected to a micrometer drive 48 oriented perpendicular to the axis of the fiber 106. Rotation of the micrometer drive, as indicated by arrow 50, pushes and rotates the wedge against a spring 52, thereby sliding the bed linearly along the track, as indicated by arrow 54. This has the effect of lengthening the distance between the laser assembly clamp 112 at the first end 108 of the laser assembly 100, and the fiber clamp 38 disposed on the fiber mounting platform 32, thereby linearly stretching the fiber. The micrometer drive allows the user to very accurately stretch the fiber in very small increments, so as to very accurately adjust the output wavelength. When the fiber is stretched and twisted to the desired extent, the fiber assembly clamp 112 at the second end 110 of the laser assembly is then clamped, fixing the laser fiber in place with a proper gross adjustment.

Figure 2:
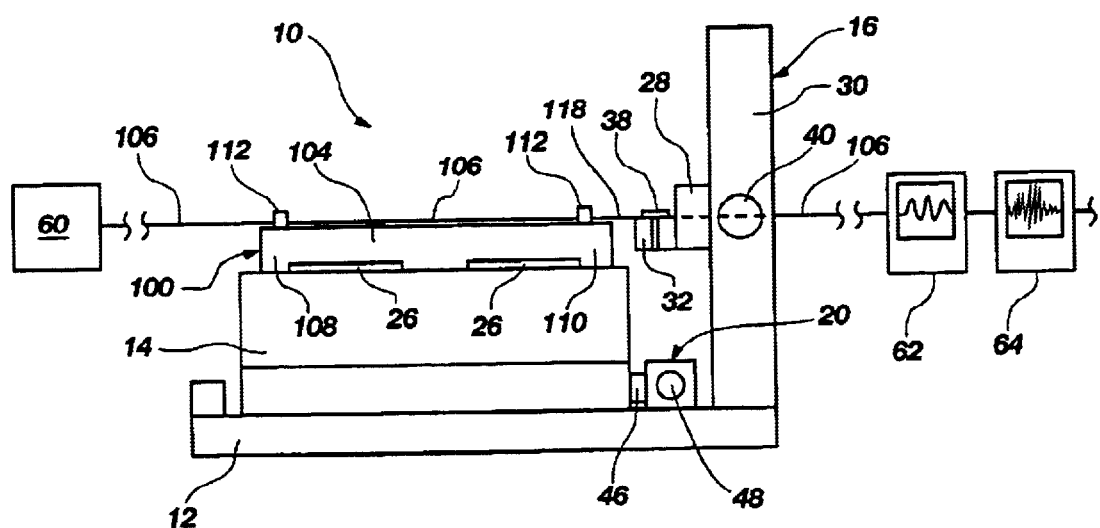
FIG. 2 is a front side view of the fiber laser tuning device of FIG. 1 with the laser fiber interconnected to a light source and a wavelength meter.
Figure 3:
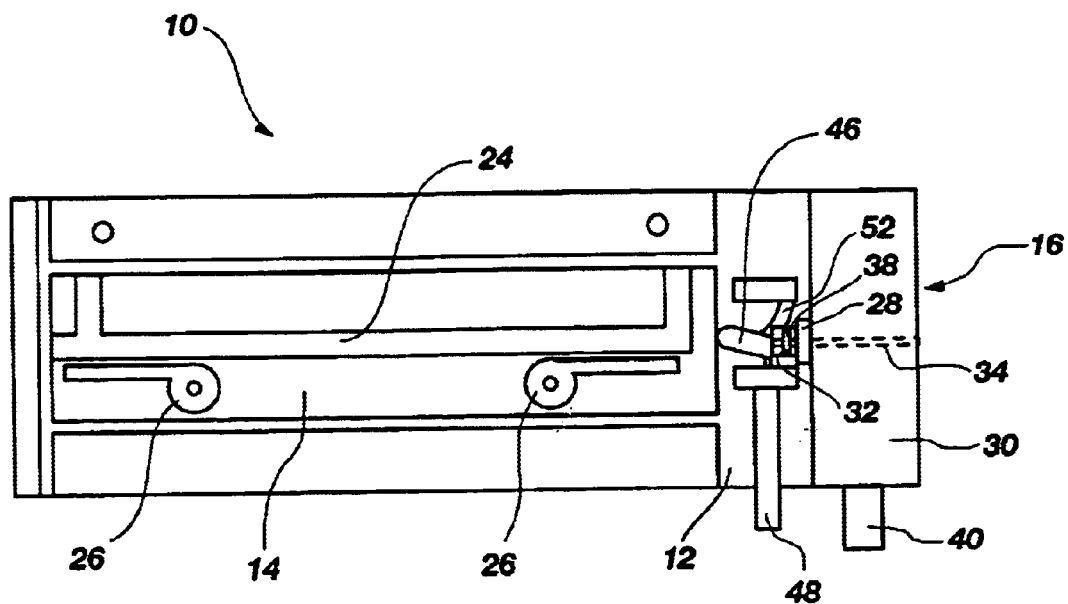
FIG. 3 is a top view of the laser tuning device of FIG. 1.
Figure 4:
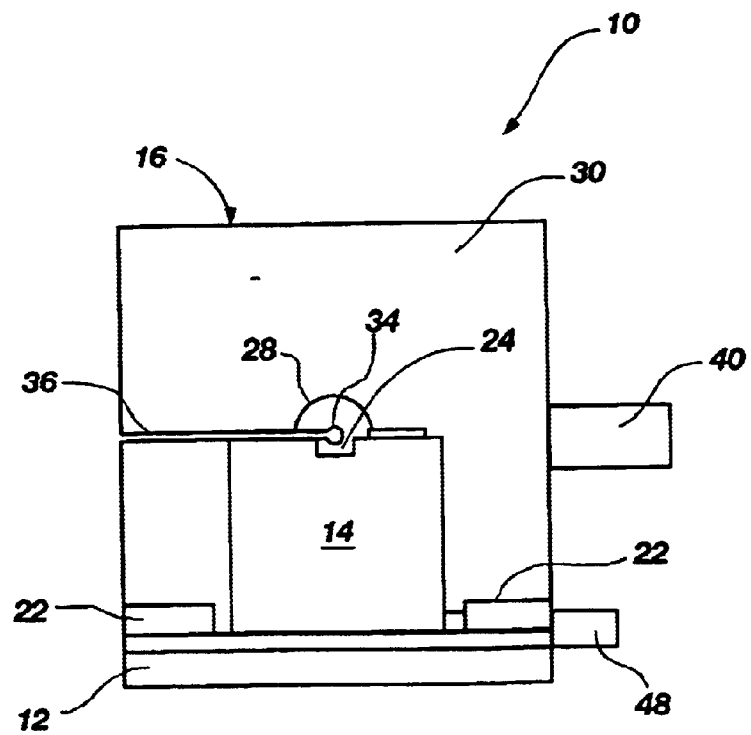
FIG. 4 is a left side view of the laser tuning device of FIG. 1.

The invention thus roughly tunes the wavelength by stretching the fiber, and tunes the dominant mode by twisting the fiber, before installation onto the laser assembly. To allow this tuning, the fiber laser operates during adjustment. Referring to FIG. 2, while the laser assembly 100 is clamped in the apparatus 10 and the fiber 106 is undergoing twisting and stretching, the laser fiber is interconnected to a light source 60, a wavelength meter 62, and an optical spectrum analyzer 64. A user can observe changes in wavelength as shown on the wavelength meter while stretching the fiber, and stop stretching when the desired wavelength is reached. Similarly, the user can monitor the change in output mode by viewing the spectrum analyzer and stop twisting when the desired mode change has been effected. This provides active feedback to a user to signal when the wavelength and mode are within the desired ranges.

It will be apparent that the system could be automated. Force to mechanically twist and pull the fiber 106 could be provided by motors or other mechanical devices (not shown), rather than by a user manually turning knobs. The mechanical twisting and pulling mechanisms in turn could be computer controlled and interconnected to the feedback devices (the wavelength meter 62 and optical spectrum analyzer 64), creating a system that automatically tunes the fiber laser to the desired wavelength and dominant mode, and then fixes it to the laser assembly.

The apparatus 10 thus allows rough adjustment of the wavelength and oscillation modes while clamping a laser fiber 106 to a laser assembly 100, and is configured for mating the laser assembly to the apparatus while attaching the fiber. Once the adjustment of the modes is completed and the wavelength is within the desired tolerance, the second clamp 112 on the second end 110 of the laser assembly is tightened to maintain the level of stress (both axial and torsional) in the fiber, and the laser assembly is then freed from the device to be installed in the final optical system.

It will be apparent that the actual required magnitude of twisting and pulling of the fiber to accomplish the purposes of the invention is actually quite small. In one operative example, using a fiber laser of 5.0 cm in length and having a desired wavelength centered at 1064 nm, the inventors have found that typical linear stretching within a range of from 0 to about 500 µm and axial twisting of about ±360° is usually sufficient to tune the wavelength and dominant mode of the fiber to the desired level, in spite of product irregularities and manufacturing variations inherent in the fibers. To this end, the limit of total linear travel of the bed 14 in the depicted apparatus 10 is about 10 mm, and the mechanical limit of rotation of the gear assembly 16 is about ±3 revolutions. It will be apparent, however, that these limits will not necessarily be suitable for all sizes and types of fibers.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A method for adjusting output characteristics of a laser fiber prior to installation in a laser assembly, comprising the steps of:
   a) affixing a first end of the fiber to a base;
   b) affixing a second end of the fiber to a rotatable device;
   c) linearly stretching the laser fiber by causing a distance between the base and the rotatable device to increase;
   d) axially twisting the laser fiber by rotating the rotatable device; and
   e) affixing the laser fiber to a laser assembly in its linearly stretched and axially twisted condition.

2. A method in accordance with claim 1, further comprising the step of monitoring the output of the laser fiber while being linearly stretched.

3. A method in accordance with claim 2, wherein the step of monitoring the output of the laser fiber more specifically comprises the steps of:
   d) operatively coupling a laser driving device to a first end of the laser fiber, so as to activate the laser fiber; and
   e) operatively coupling a wavelength meter to a second end of the laser fiber, so as to monitor the output wavelength of the laser fiber while being linearly stretched.

4. A method in accordance with claim 1, wherein the output characteristics include wavelength and dominant mode.

5. A method in accordance with claim 1, wherein the steps of linearly stretching the fiber and axially stretching the fiber are performed substantially simultaneously.

6. A method in accordance with claim 1, wherein the rotatable device comprises a gear assembly, the laser fiber being affixed to an axle thereof.

7. A method in accordance with claim 6, wherein the step of rotating the rotatable device comprises manually rotating a gear assembly knob configured to rotate gears of the gear assembly.

8. A method in accordance with claim 7, wherein the gear assembly comprises a reduction gear assembly, such that rotation of the gear assembly knob a full turn causes less than ¼ turn of the axle.

9. A method in accordance with claim 1, wherein the step of causing a distance between the base and the rotatable device to increase more specifically comprises adjusting a wedge device to move the base linearly away from the rotatable device.

10. A method in accordance with claim 9, wherein the step of adjusting the wedge device more specifically comprises manually rotating a micrometer drive, such that highly accurate small adjustments may be made in the distance between the base and the rotatable device.

11. A method in accordance with claim 1, wherein the step of linearly stretching the fiber more specifically comprises stretching the fiber within a range of from about 0 to about 500 µm, and the step of axially twisting the fiber more specifically comprises twisting the fiber within a range of from about −360° to about +360°.

12. A method of tuning an output wavelength and dominant mode of a fiber laser disposed in a laser assembly comprising a substrate and a dynamic tuning assembly, the method comprising the steps of:
   a) rough-tuning the laser to an approximate target wavelength and isolating a dominant mode during manufacture, by the steps of:
      a. linearly stretching the laser fiber so as to modify an output wavelength;
      b. axially twisting the laser fiber so as to isolate the dominant mode of oscillation;
      c. monitoring the output wavelength and dominant mode of the fiber laser during stretching and twisting until the desired characteristics of wavelength and dominant mode are reached; and d. connecting the laser fiber to the laser assembly in its linearly stretched and axially twisted condition; and b) fine-tuning the laser to a substantially exact wavelength during normal operation, by manipulating the dynamic tuning assembly to modify a length of the laser fiber.

13. A method for adjusting output characteristics of a laser fiber prior to installation in a laser assembly, comprising the steps of:

a) linearly stretching the laser fiber within a range of from about 0 to about 500 μm;

b) axially twisting the laser fiber within a range of from about −360° to about +360°; and c) affixing the laser fiber to a laser assembly in its linearly stretched and axially twisted condition.

14. A method in accordance with claim 13, further comprising the step of monitoring the output of the laser fiber while being linearly stretched.

15. A method in accordance with claim 14, wherein the step of monitoring the output of the laser fiber more specifically comprises the steps of:

d) operatively coupling a laser driving device to a first end of the laser fiber, so as to activate the laser fiber; and e) operatively coupling a wavelength meter to a second end of the laser fiber, so as to monitor the output wavelength of the laser fiber while being linearly stretched.

16. A method in accordance with claim 13, wherein the output characteristics include wavelength and dominant mode.

17. A method in accordance with claim 13, wherein the steps of linearly stretching the fiber and axially stretching the fiber are performed substantially simultaneously.

18. A method in accordance with claim 13, wherein the steps of linearly stretching and axially twisting the fiber further comprise the steps of:

e) affixing a first end of the fiber to a base;

f) affixing a second end of the fiber to a rotatable device;

g) rotating the rotatable device to axially twist the fiber; and h) causing a distance between the base and the rotatable device to increase, so as to linearly stretch the fiber.

19. A method in accordance with claim 18, wherein the rotatable device comprises a gear assembly, the laser fiber being affixed to an axle thereof.

20. A method in accordance with claim 19, wherein the step of rotating the rotatable device comprises manually rotating a gear assembly knob configured to rotate gears of the gear assembly.

21. A method in accordance with claim 20, wherein the gear assembly comprises a reduction gear assembly, such that rotation of the gear assembly knob a full turn causes less than ¼ turn of the axle.

22. A method in accordance with claim 18, wherein the step of causing a distance between the base and the rotatable device to increase more specifically comprises adjusting a wedge device to move the base linearly away from the rotatable device.

23. A method in accordance with claim 22, wherein the step of adjusting the wedge device more specifically comprises manually rotating a micrometer drive, such that highly accurate small adjustments may be made in the distance between the base and the rotatable device.

* * * * *